United States Patent
Yamamoto

(10) Patent No.: US 9,740,276 B2
(45) Date of Patent: Aug. 22, 2017

(54) ELECTRONIC DEVICE AND METHOD FOR CONTROLLING ELECTRONIC DEVICE

(71) Applicant: Kenji Yamamoto, Tokyo (JP)

(72) Inventor: Kenji Yamamoto, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 14/761,509

(22) PCT Filed: Feb. 12, 2013

(86) PCT No.: PCT/JP2013/053217
§ 371 (c)(1),
(2) Date: Jul. 16, 2015

(87) PCT Pub. No.: WO2014/125560
PCT Pub. Date: Aug. 21, 2014

(65) Prior Publication Data
US 2015/0338911 A1 Nov. 26, 2015

(51) Int. Cl.
*G06F 1/00* (2006.01)
*G06F 1/32* (2006.01)
(Continued)

(52) U.S. Cl.
CPC .......... *G06F 1/3296* (2013.01); *G06F 1/10* (2013.01); *G06F 3/1446* (2013.01);
(Continued)

(58) Field of Classification Search
CPC .......................................................... G06F 1/32
See application file for complete search history.

(56) References Cited

U.S. PATENT DOCUMENTS

| 7,702,963 B2 * | 4/2010 | Wallace | G06F 11/277 |
|---|---|---|---|
| | | | 714/22 |
| 2002/0073256 A1 * | 6/2002 | Nakamura | H04L 69/323 |
| | | | 710/104 |

(Continued)

FOREIGN PATENT DOCUMENTS

| CN | 101689073 A | 3/2010 |
|---|---|---|
| CN | 102233756 A | 11/2011 |

(Continued)

OTHER PUBLICATIONS

International Search Report (ISR) (PCT Form PCT/ISA/210), in PCT/JP2013/053217, dated Mar. 26, 2013.

(Continued)

*Primary Examiner* — Mohammed Rehman
(74) *Attorney, Agent, or Firm* — McGinn IP Law Group, PLLC.

(57) ABSTRACT

There are provided n (n is an integer greater than or equal to 2) physical layer control units which communicate with another apparatus connected to a device itself and control a physical layer, a logical layer control unit which controls a logical layer in communication with the other apparatus, and a control unit which controls the logical layer control unit from a power-supply ON state to a standby state in accordance with a standby instruction for the device itself, wherein one physical layer control unit of the n physical layer control units generates a clock using a connected resonator and the other physical layer control units receive the clock generated by the physical layer control unit to which the resonator is connected.

20 Claims, 8 Drawing Sheets

(51) Int. Cl.
  *G06F 1/10*    (2006.01)
  *H04L 29/08*   (2006.01)
  *G06F 3/14*    (2006.01)
  *G09G 5/18*    (2006.01)

(52) U.S. Cl.
  CPC ............ *H04L 69/323* (2013.01); *G09G 5/18* (2013.01); *G09G 2330/021* (2013.01)

(56) References Cited

U.S. PATENT DOCUMENTS

| | | | | |
|---|---|---|---|---|
| 2005/0057952 | A1* | 3/2005 | Mayega | G05F 1/56 363/100 |
| 2007/0280026 | A1* | 12/2007 | Hunter | G11C 5/143 365/227 |
| 2009/0243958 | A1* | 10/2009 | Matsumoto | G06F 3/1423 345/1.1 |
| 2010/0223406 | A1* | 9/2010 | Greeff | G06F 13/4086 710/61 |
| 2011/0153889 | A1* | 6/2011 | Barrenscheen | H04L 12/403 710/110 |
| 2011/0234774 | A1* | 9/2011 | Satoh | G02B 27/2264 348/56 |
| 2011/0249292 | A1* | 10/2011 | Hirano | B41J 29/10 358/1.15 |
| 2011/0264971 | A1* | 10/2011 | Bahl | 714/731 |
| 2012/0056870 | A1* | 3/2012 | Koh | G09G 3/20 345/215 |
| 2012/0326694 | A1* | 12/2012 | Sessions | G05F 3/24 323/312 |
| 2013/0191667 | A1* | 7/2013 | Haj-Yihia | G06F 1/3243 713/322 |
| 2014/0089375 | A1* | 3/2014 | Poornachandran | G06F 1/3293 709/202 |
| 2014/0211095 | A1* | 7/2014 | Dickens | H04N 5/38 348/723 |
| 2014/0266317 | A1* | 9/2014 | Sessions | G05F 1/565 327/102 |
| 2015/0121520 | A1* | 4/2015 | Tsien | G06F 21/57 726/22 |
| 2015/0169038 | A1* | 6/2015 | Kim | G06F 1/3265 345/173 |
| 2015/0286236 | A1* | 10/2015 | Dornseifer | G05F 3/30 323/313 |
| 2015/0340009 | A1* | 11/2015 | Loeffler | G06F 3/1438 345/1.3 |

FOREIGN PATENT DOCUMENTS

| | | |
|---|---|---|
| JP | 2003-199092 A | 7/2003 |
| JP | 2011-010043 A | 1/2011 |
| JP | 2011-010405 A | 1/2011 |
| JP | 2011-182123 A | 9/2011 |
| JP | 2012-070235 A | 4/2012 |

OTHER PUBLICATIONS

Chinese Office Action, dated Apr. 26, 2017, in Chinese Application No. 201380072652.X and English Translation thereof.

* cited by examiner

ELECTRONIC DEVICE AND METHOD FOR CONTROLLING ELECTRONIC DEVICE

TECHNICAL FIELD

The present invention relates to an electronic device and a method for controlling the electronic device.

BACKGROUND ART

Recently, terminals for providing various types of information, for example, have been installed in public places and commercial facilities such as hospitals, museums, libraries, tourist resorts, and stations. Display apparatuses installed in these public places and commercial facilities require a large screen capable of displaying much information.

As one method for realizing a large screen, a method for disposing a plurality of display apparatuses horizontally and vertically has been proposed (for example, see Patent Document 1).

When a plurality of terminals are disposed in this manner, all display apparatuses are connected in a daisy chain or other display apparatuses are connected to a master device. Then, each display apparatus receives a video signal and a control signal output from a processing apparatus for controlling each display apparatus via each connection unit. As communication between the processing apparatus and the terminals and between the display apparatuses, for example, communication by universal asynchronous receiver/transmitter (UART), communication by an inter-integrated circuit (I2C) bus, and communication by a local area network (LAN) are used.

For example, when a plurality of display apparatuses are connected through LAN cables, each display apparatus has a physical layer circuit unit that controls a physical layer and a logical layer circuit unit that controls a logical layer. The physical layer circuit unit, for example, converts a logical signal into an electrical signal. The logical layer circuit unit, for example, interprets a media access control (MAC) address or the like from information of a transmitted MAC frame. The display apparatuses connected in the daisy chain have a plurality of LAN ports to which LAN cables are connected and have a physical layer circuit unit for each LAN port.

In addition, recently, reduction of power consumption during standby has been required. Thus, when, for example, a video signal and a control signal are not input to a plurality of display apparatuses, each display apparatus is controlled in a standby state. Here, the standby state refers to a state in which functional units other than circuits necessary for restoring power-supply of the display apparatus are controlled in a standby state. Each display apparatus causes each circuit to be shifted to the standby state by detecting an operation unit provided in at least one display apparatus among a plurality of connected display apparatuses has been operated in the standby state.

In addition, the processing apparatus which controls the plurality of display apparatuses sets each display apparatus to a power-supply ON state by transmitting an instruction for shifting from the standby state to the power-supply ON state to each display apparatus using a wake-on LAN (WOL) function of the LAN.

PRIOR ART DOCUMENT

Patent Document

Patent Document 1: Japanese Unexamined Patent Application, First Publication No. 2003-199092

SUMMARY OF INVENTION

Problems to be Solved by the Invention

However, in the conventional technology, each display apparatus is shifted from the standby state to the power-supply ON state through the WOL function in accordance with the instruction transmitted from the processing apparatus. Thus, in the conventional technology, it is necessary to set a power supply of the physical layer circuits unit, the logical layer circuit, and the like within the display apparatus in the ON state even in the standby state and thus it is difficult to efficiently reduce power consumption during the standby state because the logical layer circuit unit and the physical layer circuit for each LAN port consume power. In particular, it is necessary for the physical layer circuit units to insulate a communication line and the apparatuses and power consumption is large because a logical signal is converted into an electrical signal.

The present invention has been made in view of the aforementioned problems, and an exemplary object thereof is to provide an electronic device and a method for controlling the electronic device for efficiently reducing power consumption in a standby state.

Means for Solving the Problems

In order to accomplish the aforementioned exemplary object, a display apparatus in accordance with an exemplary aspect of the present invention includes: n (n is an integer greater than or equal to 2) physical layer control units which communicate with another apparatus connected to the device itself and control a physical layer; a logical layer control unit which controls a logical layer in communication with the other apparatus; and a control unit which controls the logical layer control unit from a power-supply ON state to a standby state in accordance with a standby instruction for the device itself, wherein one physical layer control unit of the n physical layer control units generates a clock using a connected resonator, and another physical layer control unit receives the clock generated by the physical layer control unit to which the resonator is connected.

In order to accomplish the aforementioned exemplary object, in a method for controlling a display apparatus in accordance with an exemplary aspect of the present invention, an electronic device includes: n (n is an integer greater than or equal to 2) physical layer control units which communicate with another apparatus connected to the device itself and control a physical layer; and a logical layer control unit which controls a logical layer in communication with the other apparatus, and the method includes: a step of generating a clock using an resonator connected to one physical layer control unit among the n physical layer control units and supplying the generated clock to another physical layer control unit; a step of controlling the logical layer control unit from a power-supply ON state to a standby state in accordance with a standby instruction for the device itself; and a step of controlling the logical layer control unit from the standby state to the power-supply ON state in accordance with a shift instruction from the standby state to the power-supply ON state for the device itself.

Advantageous Effects of the Invention

In accordance with the present invention, it is possible to efficiently reduce power consumption in a standby state of an electronic device.

MODES FOR CARRYING OUT THE INVENTION

First, an outline of the present invention will be described.

In an electronic device of the present invention, a resonator is connected to a first physical layer control unit provided in the electronic device, and the first physical layer control unit generates a reference clock signal using the resonator. Then, a control unit provided in the electronic device operates only the first physical layer control unit which generates the reference clock signal in accordance with a standby instruction for the device itself and controls a logical layer control unit in a standby state. Thereby, the electronic device in accordance with the present invention efficiently reduces power consumption in the standby state.

Hereinafter, exemplary embodiments of the present invention will be described in detail using the drawings. It is to be noted that the exemplary embodiments of the present invention describes an example in which the electronic device is adapted to a display apparatus.

[First Exemplary Embodiment]

Figure 1:
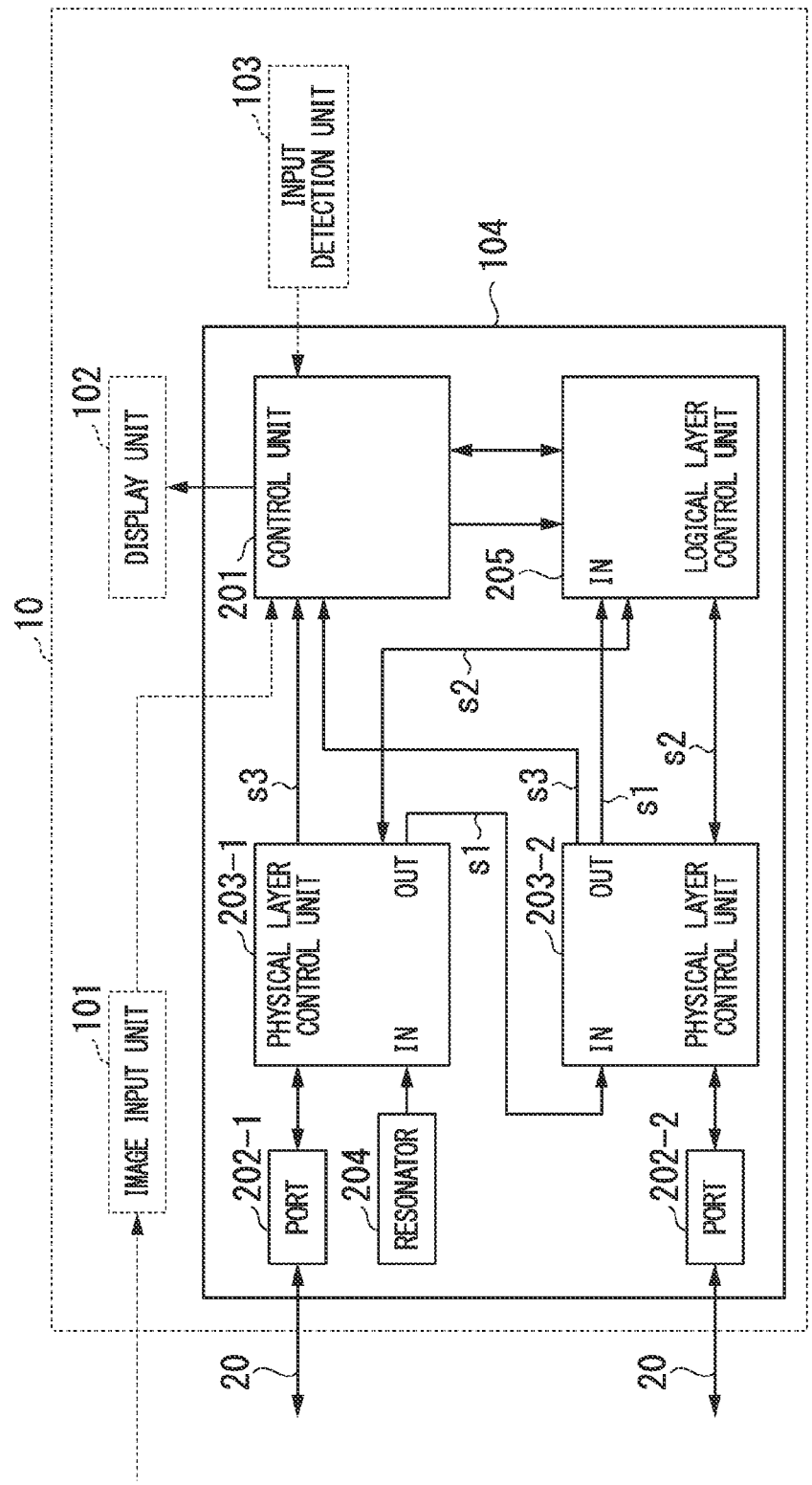
FIG. 1 is a schematic configuration diagram of a display apparatus in accordance with a first exemplary embodiment.

FIG. 1 is a schematic configuration diagram of a display apparatus 10 in accordance with the present exemplary embodiment. As illustrated in FIG. 1, the display apparatus 10 includes an image input unit 101, a display unit 102, an input detection unit 103, and a communication control unit 104.

The image input unit 101 outputs a video signal input externally to a control unit 201 of the communication control unit 104. The display unit 102 displays an image under control of the control unit 201. The display unit 102, for example, is a liquid crystal panel configured to include a backlight apparatus or the like. A display element mounted on the display unit 102 may be a display element of a type other than the liquid crystal type, for example, an organic electroluminescence display element, an inorganic electroluminescence display element, a plasma address liquid crystal (PALC), a plasma display panel (PDP), or a field emission display (FED). In addition, the display unit 102 may be a projector.

The input detection unit 103 detects that an operation button provided in a main body of the display apparatus 10 has been operated or detects an operation signal received by a remote-control light-receiving unit of the display apparatus 10, and outputs the detected operation signal to the control unit 201.

The communication control unit 104 includes the control unit 201, ports 202-1 and 202-2, a first physical layer control unit 203-1, a second physical layer control unit 203-2, a resonator 204, and a logical layer control unit 205.

The control unit 201 performs control so that no power is supplied to the logical layer control unit 205 when the operation signal input from the input detection unit 103 is a standby instruction signal. It is to be noted that the standby state refers to a state in which functional units other than circuits necessary for restoring power-supply of the display apparatus 10 is controlled in a standby state. In addition, the control unit 201 performs control so that power is supplied to the logical layer control unit 205 in accordance with an interrupt signal s3 output by the first physical layer control unit 203-1 or the second physical control unit 203-2. The control unit 201 displays a video signal input from the image input unit 101 on the display unit 102.

The ports 202-1 and 202-2, for example, are local area network (LAN) ports to which LAN cables 20 are connected.

The first physical layer control unit 203-1 generates a reference clock signal s1 using the resonator 204 connected to an IN port. The first physical layer control unit 203-1 outputs the generated reference clock signal s1 from an OUT port to the second physical layer control unit 203-2 via an internal buffer circuit. It is to be noted that the first physical layer control unit 203-1, the second physical layer control unit 203-2, and the logical layer control unit 205 use the reference clock signal s1, for example, for timing alignment of a reception signal and a transmission signal.

The first physical layer control unit 203-1 receives a reception signal transmitted by an external apparatus via the LAN cable 20 and the port 202-1. Here, the reception signal includes reception data, a control signal, and the like. The first physical layer control unit 203-1 outputs a transmission signal output by the logical layer control unit 205 to the external apparatus via the LAN cable 20 and the port 202 in accordance with control of the control unit 201. Here, the transmission signal includes transmission data, a control signal, and the like. The first physical layer control unit 203-1 performs a process in the physical layer for the received control signal. It is to be noted that the process of the physical layer includes buffer processing related to the transmission signal, buffer processing related to the reception signal, a digital-to-analog (DA) conversion process on a signal, or the like. The first physical layer control unit 203-1 outputs the signal s2 obtained by performing the processing of the physical layer to the logical layer control unit 205. In addition, when a magic packet to be described below has been received, the first physical layer control unit 203-1 generates the interrupt signal s3 and outputs the generated interrupt signal s3 to the control unit 201.

The resonator 204 is a passive element for causing oscillation of a desired frequency, and, for example, is a crystal resonator. It is to be noted that the resonator 204 may be an oscillator.

The second physical layer control unit 203-2 outputs the reference clock signal s1, which has been input from the first physical layer control unit 203-1 to the IN port, from the OUT port to the logical layer control unit 205 via the internal buffer circuit. The second physical layer control unit 203-2 receives the reception signal transmitted by the external apparatus via the LAN cable 20 and the port 202-2. The second physical layer control unit 203-2 outputs the transmission signal output by the logical layer control unit 205 to the external apparatus via the LAN cable 20 and the port 202-2 in accordance with control of the control unit 201.

The second physical layer control unit 203-2 performs the processing of the physical layer on the received reception signal. The second physical layer control unit 203-2 outputs the signal s2 obtained by performing the processing of the physical layer to the logical layer control unit 205. In addition, when the magic packet to be described below has been received, the second physical layer control unit 203-2 generates the interrupt signal s3 and outputs the generated interrupt signal s3 to the control unit 201.

It is to be noted that the first physical layer control unit 203-1 and the second physical layer control unit 203-2, for example, are physical layer (PHY) chips. In addition, a signal of a media independent interface (MII) standard, a reduced MII (RMII) standard, a gigabit MII (GMII) standard, or the like is used as the signal s2 to be input/output between the first physical layer control unit 203-1 or the second physical layer control unit 203-2 and the logical layer control unit 205.

The logical layer control unit 205 performs processing of the logical layer such as a process of interpreting a media access control (MAC) address or the like for the signal s2 output by the first physical layer control unit 203-1 or the second physical layer control unit 203-2. The logical layer control unit 205 outputs reception data or the like after the processing of the logical layer is performed to the control unit 201. When the display apparatus 10 is in the standby state, the supply of power to the logical layer control unit 205 is stopped via control of the control unit 201 and the supply of power to the logical layer control unit 205 is resumed by control of the control unit 201 at the time of restoration.

In addition, the logical layer control unit 205 performs the processing of the logical layer on the transmission signal output by the control unit 201 and outputs transmission data or the like obtained by performing the processing of the logical layer to the first physical layer control unit 203-1 or the second physical layer control unit 203-2.

Figure 2:
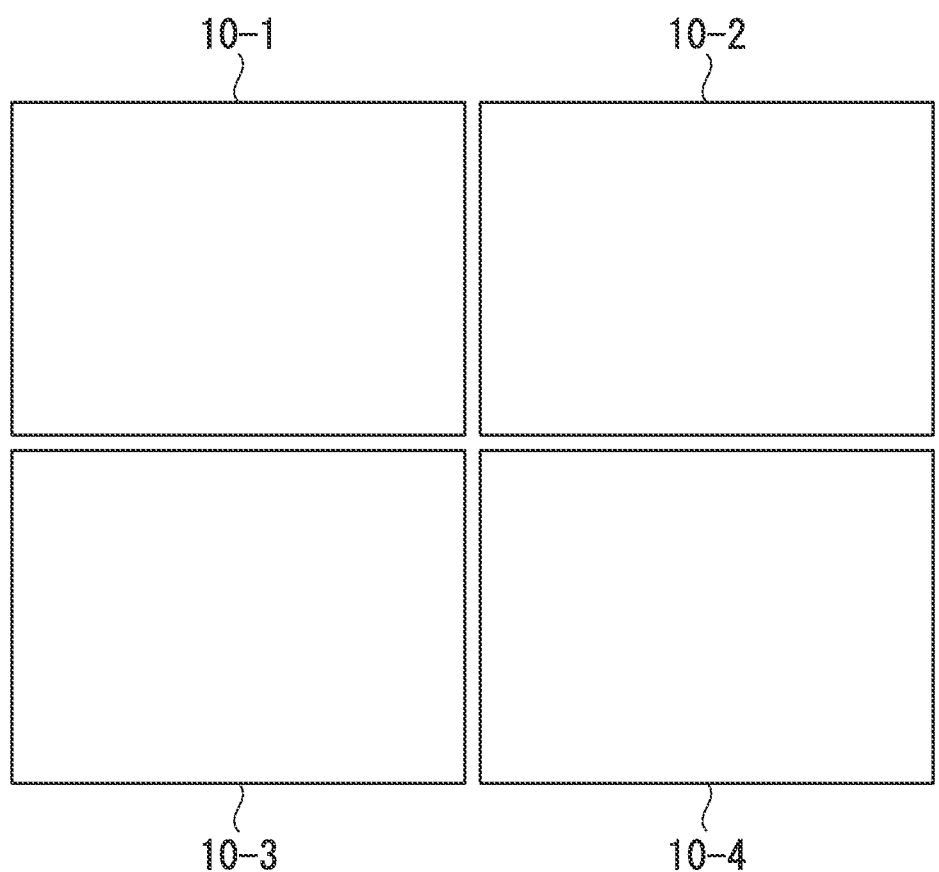
FIG. 2 is a diagram explaining a layout of four display apparatuses in accordance with the present exemplary embodiment.

FIG. 2 is a diagram explaining a layout of four display apparatuses 10-1 to 10-4 in accordance with the present exemplary embodiment. In the example illustrated in FIG. 2, the four display apparatuses 10-1 to 10-4 are disposed such that two display apparatuses are arranged in the vertical direction and two display apparatuses are arranged in the horizontal direction, and display one image or different images on the display apparatuses 10-1 to 10-4. FIG. 2 shows an example in which the display apparatus 10-1 is disposed at an upper-left position, the display apparatus 10-2 is disposed at an upper-right position, the display apparatus 10-3 is disposed at a lower-left position, and the display apparatus 10-4 is disposed at a lower-right position. It is to be noted that in the following description, when no specific display apparatuses 10-1 to 10-4 are intended, they are simply referred to as display apparatuses 10. In addition, each of the display apparatuses 10-1 to 10-4 has the structure illustrated in FIG. 1. Thus, functional units when no specific display apparatus 10 is intended are simply referred to as the image input unit 101, the display unit 102, the input detection unit 103, and the communication control unit 104. In addition, for example, when a screen size of each display apparatus 10 is 40 inches, a screen size obtained by integrating the four display apparatuses 10 corresponds to 80 inches.

Figure 3:
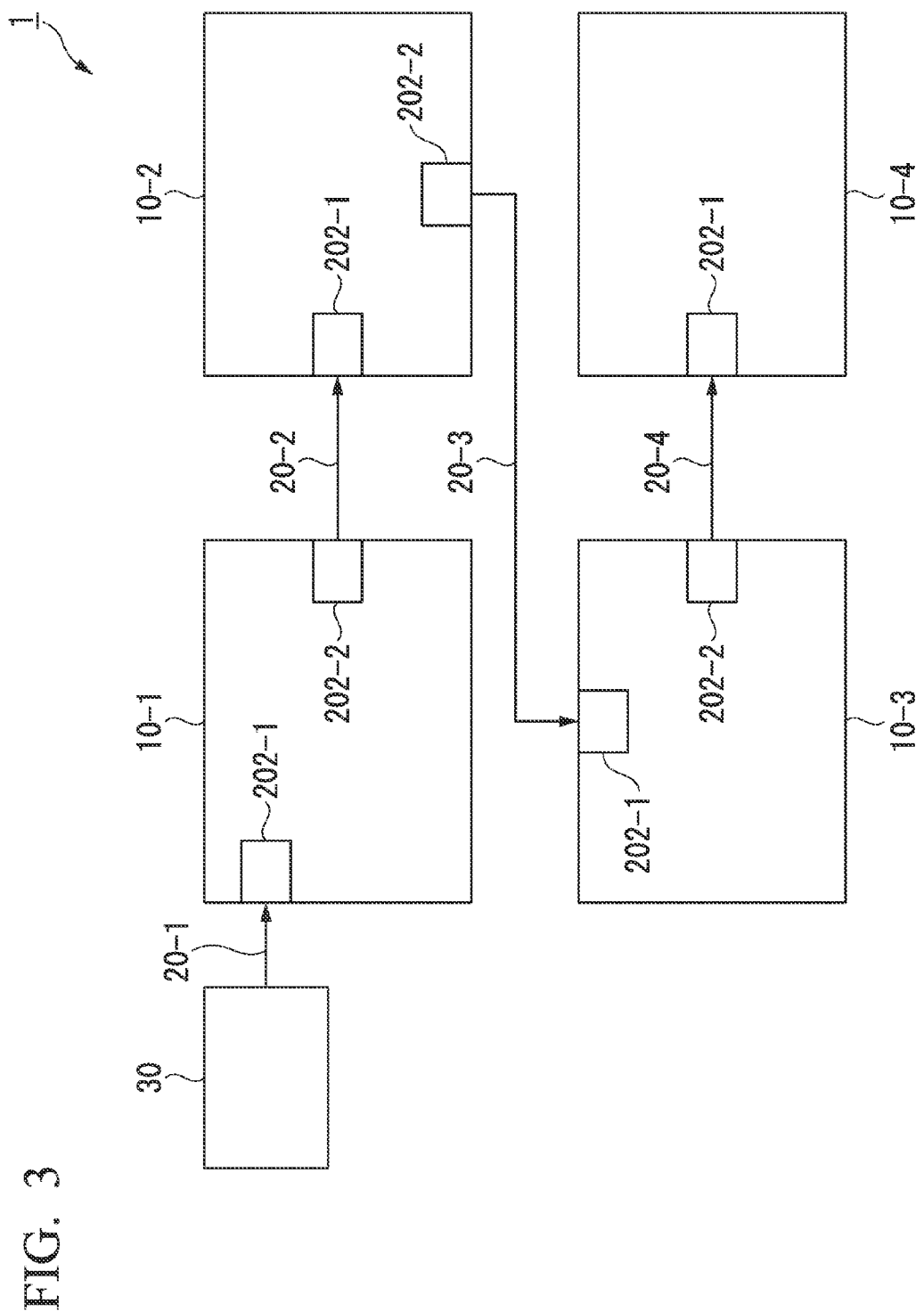
FIG. 3 is a diagram explaining an example of a connection of an image display system in accordance with the first exemplary embodiment.

FIG. 3 is a diagram explaining a connection example of an image display system 1 in accordance with the present exemplary embodiment. As illustrated in FIG. 3, the image display system 1 includes the four display apparatuses 10-1 to 10-4 and a processing apparatus 30. The configuration of each display apparatus 10 is the configuration illustrated in FIG. 1. The processing apparatus 30 and the display apparatuses 10-1 to 10-4 are connected in a daisy chain connection through LAN cables 20-1 to 20-4.

In the example illustrated in FIG. 3, the processing apparatus 30 is connected to one end of the LAN cable 20-1 and the other end of the LAN cable 20-1 is connected to a port 202-1 of the display apparatus 10-1. In addition, one end of the LAN cable 20-2 is connected to a port 202-2 of the display apparatus 10-1, and the other end of the LAN cable 20-2 is connected to the port 202-1 of the display apparatus 10-2. In addition, one end of the LAN cable 20-3 is connected to the port 202-2 of the display apparatus 10-2, and the other end of the LAN cable 20-3 is connected to the port 202-1 of the display apparatus 10-3. In addition, one end of the LAN cable 20-4 is connected to the port 202-2 of the display apparatus 10-3, and the other end of the LAN cable 20-4 is connected to the port 202-1 of the display apparatus 10-4.

Next, control for shifting the display apparatus 10 to the standby state and control for shifting the display apparatus 10 from the standby state to the power-supply ON state will be described.

First, the control for shifting to the standby state will be described.

When it is detected that a remote controller (not illustrated) has transmitted an instruction for shifting to the standby state, the input detection unit 103 of each display apparatus 10 outputs a detected operation signal to the control unit 201. The control unit 201 of each display apparatus 10 performs control so that no power is supplied to the logical layer control unit 205 within the apparatus itself in accordance with the operation signal indicating the standby instruction output by the input detection unit 103. Thereby, the logical layer control unit 205 is in the standby state.

Figure 4:
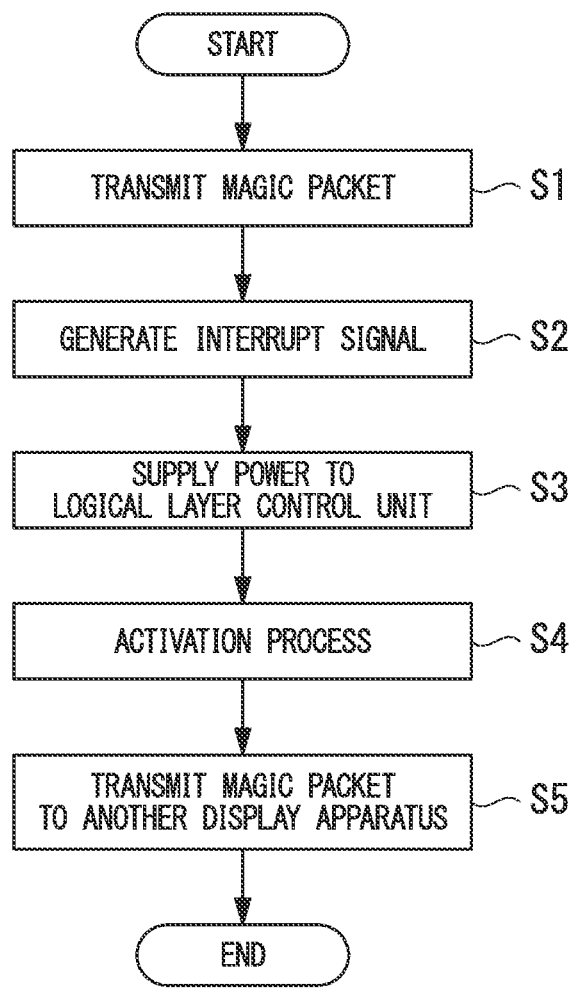
FIG. 4 is a flowchart of a processing procedure for a shift from a standby state to a power-supply ON state in accordance with the first exemplary embodiment.

Next, the control for shifting from the standby state to the power-supply ON state will be described. FIG. 4 is a flowchart of a processing procedure for a shift from a standby state to a power-supply ON state in accordance with the present exemplary embodiment. It is to be noted that the following process is a process when the processing apparatus 30 is connected to the display apparatus 10-1 via the LAN cable 20-1 as illustrated in FIG. 3.

(Step S1) The processing apparatus 30 transmits a packet for executing the WOL function to the display apparatus 10-1 via the LAN cable 20-1. For example, when the magic packet scheme is used, the processing apparatus 30, for example, transmits a user datagram protocol (UDP) data of 102 bytes including data of 0xff-0xff-0xff-0xff-0xff-0xff (6 bytes) and data obtained by repeating a MAC address (6 bytes) corresponding to the display apparatus 10 of the WOL target sixteen times in a broadcast mode. It is to be noted that the packet transmitted by the processing apparatus 30 may be a customized packet.

(Step S2) The first physical layer control unit 203-1 of the display apparatus 10-1 generates an interrupt signal s3 in accordance with the magic packet received from the processing apparatus 30 via the LAN cable 20-1 and outputs the generated interrupt signal s3 to the control unit 201.

(Step S3) The control unit 201 of the display apparatus 10-1 performs control so that the supply of power for the logical layer control unit 205 of the apparatus itself is resumed in accordance with the interrupt signal s3 output by the first physical layer control unit 203-1.

(Step S4) The logical layer control unit 205 of the display apparatus 10-1 performs an activation process of the unit itself after the supply of power is resumed.

(Step S5) After the display apparatus 10-1 is activated, the logical layer control unit 205 transmits the magic packet for another display apparatus 10 to the display apparatus 10-2 via the second physical layer control unit 203-2, the port 202-2, and the LAN cable 20-2. It is to be noted that the magic packet for the other display apparatus 10 may be included in the magic packet transmitted by the processing apparatus 30 to the display apparatus 10-1 or may be generated by the control unit 201 of the display apparatus 10-1 and output to the logical layer control unit 205.

Hereinafter, the first physical layer control unit 203-1 of the display apparatus 10-2 generates the interrupt signal s3 in accordance with the magic packet received from the display apparatus 10-1 via the LAN cable 20-2 and outputs the generated interrupt signal s3 to the control unit 201 of the apparatus itself. Like the display apparatus 10-1, the display apparatus 10-2 performs the process of steps S3 to S5. Then, like the display apparatus 10-1, the display apparatus 10-3 performs the process of steps S2 to S5. Further, like the display apparatus 10-1, the display apparatus 10-4 performs the process of steps S2 to S5. Through the above process, the display apparatuses 10 cause each logical layer control unit 205 controlled in the standby state to be shifted from the standby state to the power-supply ON state.

Figure 5:
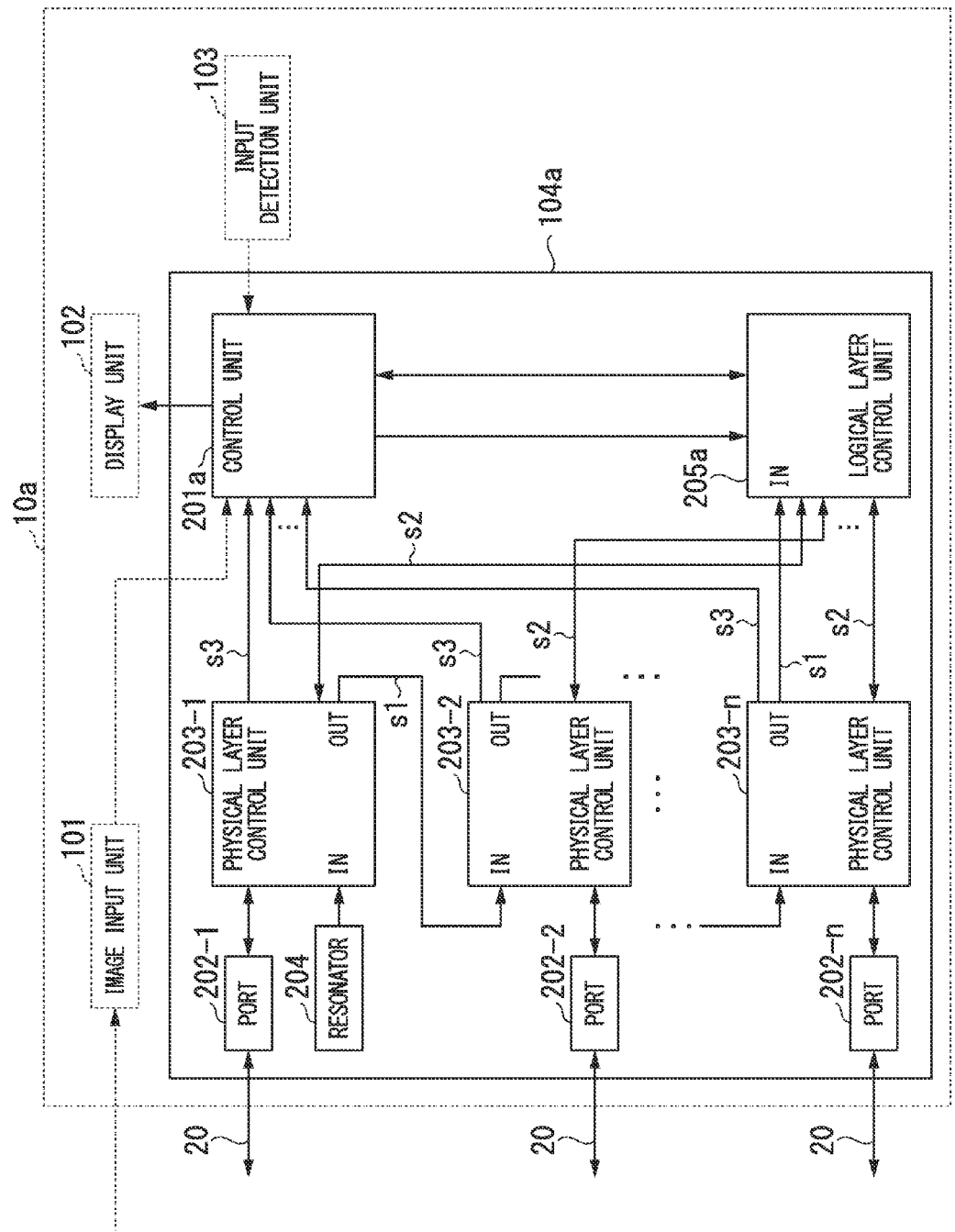
FIG. 5 is a schematic configuration diagram of a display apparatus having three or more physical layer control units in accordance with the present exemplary embodiment.

It is to be noted that although the above-described example describes an example in which the display apparatus 10 has two physical layer control units 203, the present embodiment is not limited thereto. The display apparatus 10 may include three or more physical layer control units 203. FIG. 5 is a schematic configuration diagram of a display apparatus 10a having three or more physical layer control units 203 in accordance with the present exemplary embodiment. The same functional units as those of the display apparatus 10 illustrated in FIG. 1 are denoted by the same reference signs and a description thereof will be omitted.

As illustrated in FIG. 5, a communication control unit 104a of the display apparatus 10a includes a control unit 201a, n (n is an integer greater than or equal to 3) ports 202-1 to 202-n, n physical layer control units 203-1 to 203-n, an resonator 204, and a logical layer control unit 205a.

When the operation signal output by the input detection unit 103 is a standby instruction, the control unit 201a performs control so that no power is supplied to the logical layer control unit 205a. In addition, the control unit 201 performs control so that power is supplied to the logical layer control unit 205 in accordance with the interrupt signal s3 output by any one of the first to $n^{th}$ physical layer control units 203.

The second physical layer control unit 203-2 outputs the reference clock signal s1, which has been input from the first physical layer control unit 203-1, from the OUT port to the third physical layer control unit 203-3 via an internal buffer circuit. Likewise, the $(n-1)^{th}$ physical layer control unit 203-(n−1) outputs the reference clock signal s1, which has been input from the $(n-2)^{th}$ physical layer control unit 203-(n−2), from the OUT port to the $n^{th}$ physical layer control unit 203-n via the internal buffer circuit. The $n^{th}$ physical layer control unit 203-n outputs the reference clock signal s1, which has been input from the $(n-1)^{th}$ physical layer control unit 203-(n−1), from the OUT port to the logical layer control unit 205a via the internal buffer circuit.

In addition, each of the first to $n^{th}$ physical layer control units 203-1 to 203-n outputs the signal s2 obtained by performing the processing of the physical layer on the received reception signal to the logical layer control unit 205a. When the magic packet has been received, the first to $n^{th}$ physical layer control units 203-1 to 203-n generate interrupt signals s3 and output the generated interrupt signals s3 to the control unit 201a.

The logical layer control unit 205a performs the processing of the logical layer on signals s2 output by the first to $n^{th}$ physical layer control units 203-1 to 203-n. After the processing of the logical layer is performed, the logical layer control unit 205a outputs reception data or the like to the control unit 201a. In the standby state, the supply of power to the logical layer control unit 205a is stopped by control of the control unit 201a, and the supply of power to the logical layer control unit 205a is resumed by control of the control unit 201a at the time of restoration.

As described above, in the standby state, the display apparatus 10a is in a state in which the reference clock signal s1 and power are supplied to only the first to $n^{th}$ physical layer control units 203-1 to 203-n waiting for the reception of the magic packet and only the first to $n^{th}$ physical layer control units 203-1 to 203-n are activated. Then, in the standby state, the reference clock signal s1 and the power are not supplied to the logical layer control unit 205a. As a result, the display apparatus 10a of the present exemplary embodiment can efficiently reduce power consumption in the standby state.

When a multi-screen as illustrated in FIG. 2 is configured, the display apparatus 10a of the above-described configuration may be used as a master device. For example, the case in which the display apparatus 10a includes four physical layer control units 203 and four ports 202 will be described. The other end of the LAN cable 20 connected to the processing apparatus 30 (see FIG. 3) is connected to the port 202-1 of the display apparatus 10a and one end of the LAN cable 20 connected to the display apparatus 10-2 is connected to the port 202-2 of the display apparatus 10a. One end of the LAN cable 20 connected to the display apparatus 10-3 is connected to the port 202-3 of the display apparatus 10a and one end of the LAN cable 20 connected to the display apparatus 10-4 is connected to the port 202-4 of the display apparatus 10a.

Figure 6:
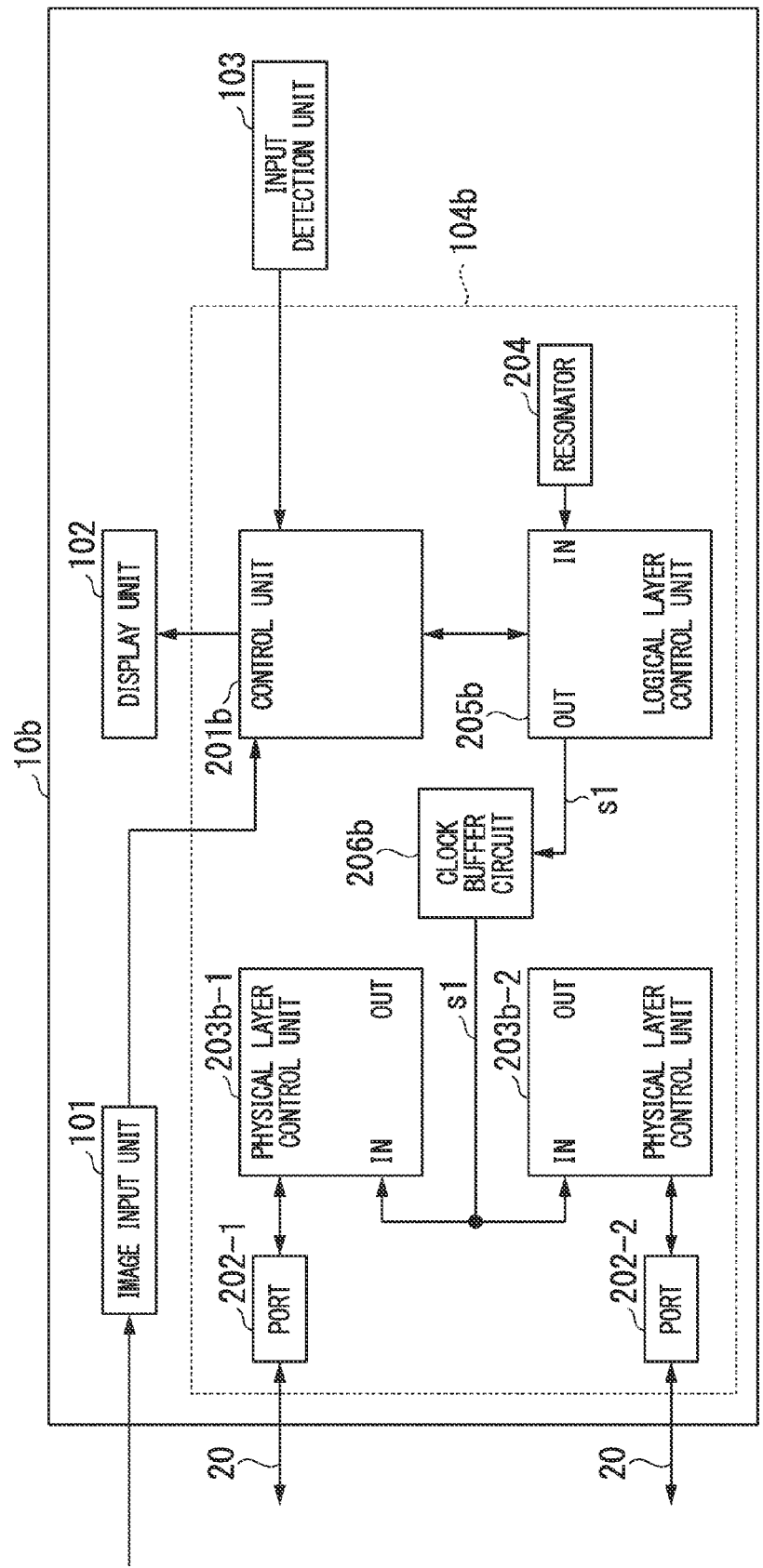
FIG. 6 is a schematic configuration diagram of a display apparatus in accordance with a comparative example.

FIG. 6 is a schematic configuration example of a display apparatus 10b of a comparative example. The same functional units as those of the display apparatus 10 illustrated in FIG. 1 are denoted by the same reference signs and a description thereof will be omitted. It is to be noted that in FIG. 6, the illustration of the signal s2 between each physical layer control unit 203b and a logical layer control unit 205b is omitted.

The logical layer control unit 205b generates the reference clock signal s1 using the resonator 204 connected to the IN port. The logical layer control unit 205b outputs the generated reference click signal s1 from the OUT port to a clock buffer circuit 206b.

The clock buffer circuit 206b is a buffer circuit for the reference clock signal s1. The clock buffer circuit 206b outputs the reference clock signal s1 output by the logical layer control unit 205b to the IN port of the first physical layer control unit 203b-1 and the IN port of the second physical layer control unit 203b-2.

In the display apparatus 10b of the comparative example illustrated in FIG. 6, the reference clock signal s1 is supplied from the logical layer control unit 205b to the first physical layer control unit 203b-1 and the second physical layer control unit 203b-2. Thus, it is necessary for the display apparatus 10b of the comparative example to supply the reference clock signal s1 to the first physical layer control unit 203b-1 and the second physical layer control unit 203b-2 so as to cause the first physical layer control unit 203b-1 and the second physical layer control unit 203b-2 to wait for reception of a magic packet or the like even in the standby state. In order to supply the reference clock signal s1 from the logical layer control unit 205b to the first physical layer control unit 203b-1 and the second physical layer control unit 203b-2, it is necessary for the display apparatus 10b of the comparative example to continuously supply power to the logical layer control unit 205b, even in the standby state.

Accordingly, in the display apparatus 10b of the comparative example, power consumption of the logical layer control unit 205b is unnecessarily excessive in the standby state as compared with the display apparatus 10 of the present exemplary embodiment illustrated in FIG. 1. In contrast, the display apparatus 10 of the present exemplary embodiment can reduce power consumption of the logical layer control unit 205b in the standby state as compared with the display apparatus 10b of the comparative example illustrated in FIG. 6.

As described above, an electronic device in accordance with the present exemplary embodiment includes: n (n is an integer greater than or equal to 2) physical layer control units which communicates with another apparatus connected to the device itself and controls a physical layer; a logical layer control unit which controls a logical layer in communication with the other apparatus; and a control unit which controls the logical layer control unit from a power-supply ON state to a standby state in accordance with a standby instruction for the device itself, wherein one physical layer control unit of the n physical layer control units generates a clock using a connected resonator, and the other physical layer control units receive the clock generated by the physical layer control unit to which the resonator is connected.

In addition, in the electronic device in accordance with the present exemplary embodiment, the n physical layer control units are connected in series in a daisy chain connection through a signal line of the clock, the physical layer control unit of a last stage connected in the daisy chain connection and the logical layer control unit are connected through the signal line of the clock, the clock generated by the physical layer control unit of a first stage to which the resonator is connected is output to the physical layer control unit of a second stage, the physical layer control units of second to $(n-1)^{th}$ stages receive clocks of physical layer control units of previous stages and output the received clocks to the physical layer control units of next stages, and the physical layer control unit of an $n^{th}$ stage which is the last stage connected in the daisy chain connection receives the clock output from the physical layer control unit of the $(n-1)^{th}$ stage and outputs the received clock to the logical layer control unit.

Through this configuration, in the standby state, the display apparatus 10 of the present exemplary embodiment is in a state in which the reference clock signal s1 and power are supplied only to the first and second physical layer control units 203-1 and 203-2 waiting for reception of a magic packet and only the first and second physical layer control units 203-1 are activated. Also, in the display apparatus 10 of the present exemplary embodiment, the reference clock signal s1 and power are not supplied to the logical layer control unit 205 in the standby state. Thus, the display apparatus 10 of the present exemplary embodiment can efficiently reduce power consumption during the standby state of the display apparatus 10.

In addition, through the configuration as described above, the display apparatus 10 of the present exemplary embodiment causes the reference clock signal s1 to be connected in a daisy chain connection and therefore it is not necessary to provide the resonator 204 for generating the reference clock signal s1 in all the physical layer control units 203 and the logical layer control unit 205. Thus, the display apparatus 10 of the present exemplary embodiment can reduce the number of resonators 204 and reduce the cost. Further, it is possible to reduce the cost because the clock buffer is unnecessary as compared with the comparative example in which the reference clock signal s1 is supplied from the logical layer control unit 205 to the physical layer control units 203 as illustrated in FIG. 6.

[Second Exemplary Embodiment]

The first exemplary embodiment describes an example in which the state is controlled to a standby state by preventing power from being supplied to a logical layer control unit 205 (including a logical layer control unit 205a). The present exemplary embodiment describes an example in which only one of a plurality of physical layer control units 203 is continuously activated in the standby state and operations of the other physical layer control units 203 are stopped.

Figure 7:
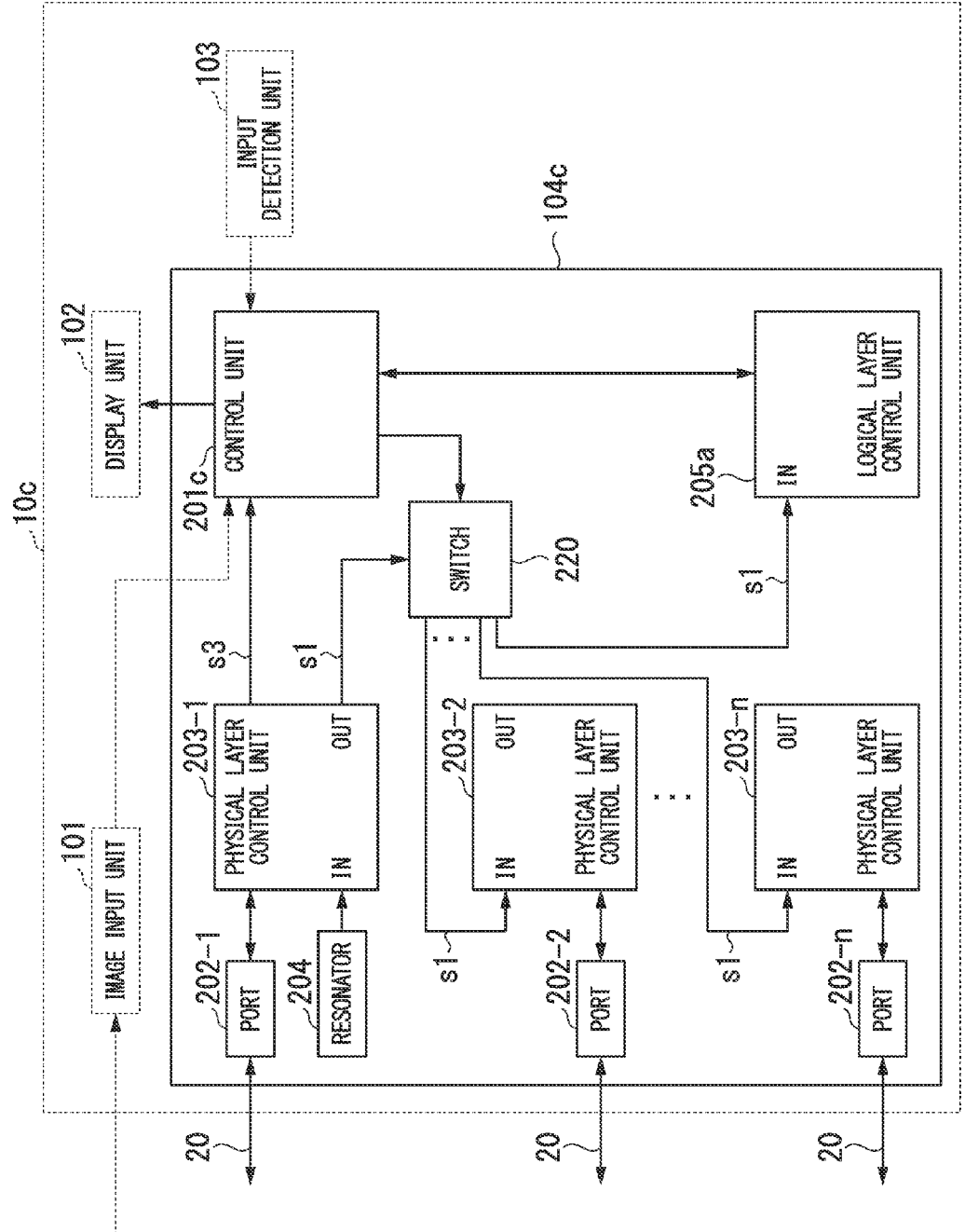
FIG. 7 is a schematic configuration diagram of a display apparatus in accordance with a second exemplary embodiment.

FIG. 7 is a schematic configuration diagram of a display apparatus 10c in accordance with the present exemplary embodiment. As illustrated in FIG. 7, the display apparatus 10c includes an image input unit 101, a display unit 102, an input detection unit 103, and a communication control unit 104c. The same functional units as those of the display apparatus 10 illustrated in FIG. 1 and the display apparatus 10a illustrated in FIG. 5 are denoted by the same reference signs and a description thereof will be omitted. It is to be noted that in FIG. 7, the illustration of the signal s2 between each physical layer control unit 203 and the logical layer control unit 205 is omitted.

The communication control unit 104c includes a control unit 201c, n (n is an integer greater than or equal to 2), ports 202-1 to 202-n, n first to $n^{th}$ physical layer control units 203-1 to 203-n, an resonator 204, a logical layer control unit 205a, and a switch 220.

When the operation signal output by the input detection unit 103 is a standby instruction, the control unit 201c switches the switch 220 so that the reference clock signal s1 is not supplied to the second to $n^{th}$ physical layer control units 203-2 to 203-n and the logical layer control unit 205a. In accordance with an interrupt signal s3 output by the first physical layer control unit 203-1, the control unit 201c switches the switch 220 so that the reference clock signal s1 is supplied to the second to $n^{th}$ physical layer control units 203-2 to 203-n and the logical layer control unit 205a.

The first physical layer control unit 203-1 generates the reference clock signal s1 using the resonator 204 connected to the IN port. The first physical layer control unit 203-1 outputs the generated reference clock signal s1 from the OUT port to the switch 220.

The reference clock signal s1 is input from the switch 220 to the IN ports of the second to $n^{th}$ physical layer control units 203-2 to 203-n and the logical layer control unit 205a.

In accordance with control by the control unit 201c, the switch 220 switches an output state of the reference clock signal s1 input from the first physical layer control unit 203-1. In addition, the switch 220 includes a clock buffer circuit for the reference clock signal s1 input from the first physical layer control unit 203-1.

As described above, the electronic device of the present exemplary embodiment includes a first switch which switches an output destination of a clock generated by the physical layer control unit to which the resonator is connected in accordance with control by the control unit, wherein the control unit switches the first switch so that the clock input to the first switch is not supplied to the physical layer control unit and the logical layer control unit to be controlled from the power-supply ON state to the standby state in accordance with the standby instruction for the device itself.

Through this configuration, in the display apparatus 10c of the present exemplary embodiment, the control unit 201c switches the switch 220 and does not output the reference clock signal s1 to the second to $n^{th}$ physical layer control units 203-2 to 203-n and the logical layer control unit 205a, in the standby state. As a result, because the reference clock signal s1 is not supplied in the standby state, the operations of the second to $n^{th}$ physical layer control units 203-2 to 203-n and the logical layer control unit 205a are stopped. Thus, it is possible to reduce power consumption of the second to $n^{th}$ physical layer control units 203-2 to 203-n and the logical layer control unit 205a in the standby state. Accordingly, the display apparatus 10c of the present exemplary embodiment can further reduce power consumption of the second to $n^{th}$ physical layer control units 203-2 to 203-n in addition to reducing the power consumption of the logical layer control unit 205a in the standby state.

It is to be noted that the switch 220 described in the present exemplary embodiment may be configured by a field programmable gate array (FPGA), a complex programmable logic device (CPLD), or the like. When the switch 220 has a plurality of output ports like the FPGA, the switch 220 distributes the reference clock signal s1 by providing the switch 220 in a subsequent stage after the first physical layer control unit 203-1 as in FIG. 7.

In addition, the above-described switch 220 can also separately control ON and OFF states of a power supply for a plurality of mounted physical layer control units 203 using an IC such as an FPGA in which output enable control is possible. In this case, the control unit 201c may separately control an unused physical layer control unit 203 in the ON and OFF states of the power supply by controlling the switch 220 so that the reference clock signal s1 is not supplied to the unused physical layer control unit 203 at times other than when the standby instruction is input. Here, the unused physical layer control unit 203 refers to a physical layer control unit 203 to which the LAN cable 20 is not connected to the port 202. It is to be noted that the control unit 201c can determine the physical layer control unit 203 to which the LAN cable 20 is not connected based on, for example, the signal s2 output by the logical layer control unit 205a during a power-supply ON state.

As described above, in the electronic device of the present exemplary embodiment, the control unit switches the first switch so that the clock input to the first switch is not supplied to the physical layer control unit in non-communication with the other apparatuses among a plurality of physical layer control units.

Thereby, the display apparatus 10c of the present exemplary embodiment can reduce power consumption at times other than when the standby instruction has been input.

It is to be noted that although the present exemplary embodiment describes an example in which the display apparatus 10c includes a large number of physical layer control units 203, the display apparatus 10c may include two physical layer control units 203-1 and 203-2. In this case, the control unit 201c switches the switch 220 so that the reference clock signal s1 is not output to the second physical layer control unit 203-2 and the logical layer control unit 205a in accordance with the standby instruction.

[Third Exemplary Embodiment]

In order to reduce the power consumption in the standby state, the first exemplary embodiment describes an example in which the supply of power is switched and the second exemplary embodiment describes an example in which the supply of the reference clock signal s1 is switched. The present exemplary embodiment describes an example in which input and output states of data are switched in the standby state.

Figure 8:
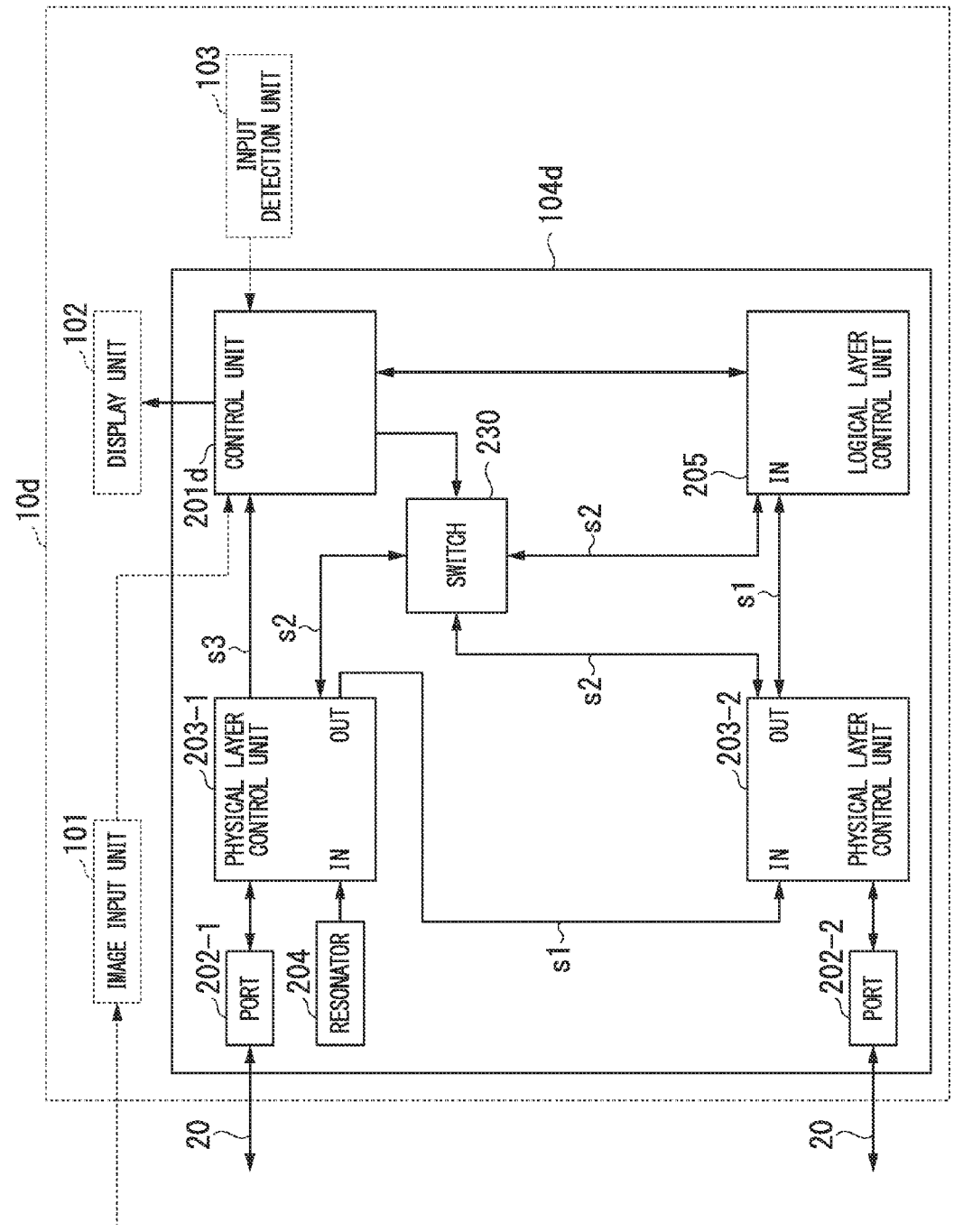
FIG. 8 is a schematic configuration diagram of a display apparatus in accordance with a third exemplary embodiment.

FIG. 8 is a schematic configuration diagram of a display apparatus 10d in accordance with the present exemplary embodiment. As illustrated in FIG. 8, the display apparatus 10d includes an image input unit 101, a display unit 102, an input detection unit 103, and a communication control unit 104d. The same functional units as those of the display apparatus 10 illustrated in FIG. 1 are denoted by the same reference signs and a description thereof will be omitted.

The communication control unit 104d includes a control unit 201d, two ports 202-1 to 202-2, first to second physical layer control units 203-1 to 203-2, a logical layer control unit 205, and a switch 230.

The control unit 201d outputs a switching signal of a first state to the switch 230 at times other than when the display apparatus 10d is in the standby state. The control unit 201d outputs a switching signal of a second state to the switch 230 when the display apparatus 10d is in the standby state. Here, the switching signal of the first state, for example, is a low-level signal, and the switching signal of the second state, for example, is a high-level signal.

The switch 230 is connected to signals s2 between the first physical layer control unit 203-1, the second physical layer control unit 203-2, and the logical layer control unit 205. The switch 230 switches the connection state of the signal s2 in the standby state in accordance with the switching signal output from the control unit 201d.

When the switching signal is in the first state, the switch 230 is switched to a state in which the signals s2 of the first physical layer control unit 203-1 and the logical layer control unit 205 are connected and switched to a state in which the signals s2 of the second physical layer control unit 203-2 and the logical layer control unit 205 are connected. When the switching signal is in the second state, the switch 230 is switched to a state in which the signals s2 of the first physical layer control unit 203-1 and the logical layer control unit 205 are disconnected and switched to a state in which the signals s2 of the second physical layer control unit 203-2 and the logical layer control unit 205 are disconnected.

The signal s2, for example, is a management serial interface for a management data input/output (MDIO) and management data clock (MDC) for controlling the physical layer control units 203. The MDIO is a bidirectional data communication line and the MDC is output from the logical layer control unit 205 and input to the physical layer control unit 203. Because the logical layer control unit 205 operates as the master device and the physical layer control unit 203 operates as the slave device in the communication of this MDIO, it is assumed that the MDIO is not output from the physical layer control unit 203 as long as a read command for reading is not received from the logical layer control unit 205.

In addition, when no power is supplied to the logical layer control unit 205 as in the first exemplary embodiment, the switch 230 described with reference to FIG. 8 may be further provided in the configuration of FIG. 1. Thereby, because it is possible to stop a data input to the logical layer control unit 205 to which no power is supplied, it is possible for the display apparatus 10d of the present exemplary embodiment to protect the input port of the logical layer control unit 205 to which no power is supplied in the standby state.

In addition, when no reference clock signal s1 is supplied to the second to $n^{th}$ physical layer control units 203-2 to 203-n as in the second exemplary embodiment, the switch 230 described with reference to FIG. 8 may be further provided in the configuration of FIG. 7. Thereby, because it is possible to stop data inputs to the second to $n^{th}$ physical layer control units 203-2 to 203-n to which no reference clock signal s1 is supplied, it is possible for the display apparatus 10d of the present exemplary embodiment to protect the input port of the logical layer control unit 205 to which no reference clock signal s1 is supplied in the standby state. In this case, firstly, the control unit 201c may switch the first switch 220 so that no reference clock s1 is supplied to the second to $n^{th}$ physical layer control units 203-2 to 203-n and the logical layer control unit 205. Next, the control unit may switch the switch 230 so that no signal s2 is input to the logical layer control unit 205 after the switch 220 is switched. Thereby, because an input of the signal s2 is stopped after the supply of the reference clock s1 to the logical layer control unit 205 is stopped, it is possible to prevent an erroneous operation of the logical layer control unit 205 while shifting from the power-supply ON state to the standby state.

In addition, when the switch 220 and the switch 230 are provided, the control unit 201d may firstly switch the switch 220 so that the reference clock s1 is supplied to the second to $n^{th}$ physical layer control units 203-2 to 203-n and the logical layer control unit 205 while shifting from the standby state to the power-supply ON state. The control unit 201d may switch the switch 230 so that the signal s2 is input to the logical layer control unit 205 after switching the switch 220. Thereby, because the signal s2 is input to the logical layer control unit 205 after the reference clock s1 is supplied, it is possible to prevent an erroneous operation of the logical layer control unit 205 while shifting from the standby state to the power-supply ON state.

The above-described switch 230 can separately control ON and OFF states of a power supply for a plurality of mounted physical layer control units 203 using the IC such as an FPGA in which output enable control is possible. In this case, the control unit 201d may control the switch 230 so that the signal s2 between the unused physical layer control unit 203 and the logical layer control unit 205 is blocked at times other than when the standby instruction has been input.

As described above, the electronic device of the present exemplary embodiment includes a second switch which switches control signals between the n physical layer control units and the logical layer control unit, wherein the control unit switches the second switch so that the control signal output from the logical layer control unit is not supplied to the physical layer control unit to be controlled from the power-supply ON state to the standby state in accordance with the standby instruction for the device itself.

Thereby, the display apparatus 10d of the present exemplary embodiment can prevent the signal s2 from the first physical layer control unit 203-1 or the second physical layer control unit 203-2 from being input to the logical layer control unit 205 to which no power is supplied in the standby state.

It is to be noted that although the first to third exemplary embodiments describe an example in which the communication control unit 104 (including the communication control units 104a, 104c, and 104d) is adapted to the display apparatus 10 (including the display apparatuses 10a, 10c, and 10d), these embodiments are not limited thereto. The communication control unit 104 may be applied to other apparatuses having a communication function. The other apparatuses having the communication function, for example, are a recorder, a video recording/reproducing apparatus, a projector, and the like.

It is to be noted that processing of the units may be performed by recording a program for implementing functions of the control unit 201 illustrated in FIG. 1, the control unit 201a illustrated in FIG. 5, the control unit 201c illustrated in FIG. 7, and the control unit 201d illustrated in FIG. 8 in the exemplary embodiments on a computer-readable recording medium and causing a computer system to read and execute the program recorded on the recording medium. It is to be noted that the "computer system" used here is assumed to include an OS and hardware such as peripheral devices. In addition, the "computer system" is assumed to also include a homepage providing environment (or displaying environment) when a WWW system is used. In addition, the "computer-readable recording medium" refers to a portable medium such as a flexible disk, a magneto-optical disc, a read only memory (ROM), a CD-ROM, a Universal Serial Bus (USB) memory connected via a USB interface (I/F), or a storage apparatus such as a hard disk embedded in the computer system. Furthermore, the "computer-readable recording medium" is also assumed to include a medium that holds a program for a constant period of time, such as a volatile memory inside a computer system serving as a server or a client. The above-described program may implement part of the above-described functions. Furthermore, the above-described program may be a program capable of implementing the above-described functions in combination with a program already recorded on the computer system.

DESCRIPTION OF REFERENCE SIGNS

Image display system
10, 10a, 10c, 10d Display apparatus
20 LAN cable
101 Image input unit
102 Display unit
103 Input detection unit
104, 104a, 104c, 104d Communication control unit
201, 201a, 201c, 201d Control unit
202-1 to 202-n Port
203-1 to 203-n Physical layer control unit
204 Resonator
205, 205a Logical layer control unit
220, 230 Switch

The invention claimed is:

1. An electronic device, comprising:
   n (n is an integer greater than or equal to 2) physical layer control units which communicate with an other apparatus connected to the device itself and control a physical layer;
   a logical layer control unit which controls a logical layer in communication with the other apparatus; and
   a control unit which controls the logical layer control unit from a power-supply ON state to a standby state in accordance with a standby instruction for the device itself,
   wherein one physical layer control unit of the n physical layer control units generates a clock using a connected resonator, and another physical layer control unit receives the clock generated by the physical layer control unit to which the resonator is connected, and
   wherein the n physical layer control units are connected in series in a daisy chain connection through a signal line of the clock, and a physical layer control unit of a last stage connected in the daisy chain connection and the logical layer control unit are connected through the signal line of the clock.

2. The electronic device according to claim 1, wherein the control unit controls the logical layer control unit from the standby state to the power-supply ON state in accordance with a shift instruction from the standby state to the power-supply ON state for the device itself.

3. The electronic device according to claim 1, wherein
   the clock generated by the physical layer control unit of a first stage to which the resonator is connected is output to a physical layer control unit of a second stage,
   wherein physical layer control units of second to $(n-1)^{th}$ stages receive the clock output from physical layer control units of previous stages and output the received clock to physical layer control units of next stages, and
   wherein the physical layer control unit of an $n^{th}$ stage, which is the last stage connected in the daisy chain connection, receives the clock output from the physical layer control unit of the $(n-1)^{th}$ stage and outputs the received clock to the logical layer control unit.

4. The electronic device according to claim 1, further comprising a second switch which switches control signals between the n physical layer control units and the logical layer control unit,
   wherein the control unit switches the second switch so that the control signal output from the logical layer control unit is not supplied to the physical layer control unit to be controlled from the power-supply ON state to the standby state in accordance with the standby instruction for the device itself.

5. The electronic device according to claim 4, wherein the control unit switches the second switch so that the control signal input to the second switch is not supplied to a physical layer control unit in non-communication with the other apparatus among the plurality of physical layer control units.

6. The electronic device according to claim 1, wherein the clock generated by the physical layer control unit of a first stage to which the resonator is connected is output to a physical layer control unit of a second stage.

7. The electronic device according to claim 6, wherein physical layer control units of second to $(n-1)^{th}$ stages receive the clock output from physical layer control units of previous stages and output the received clock to physical layer control units of next stages.

8. The electronic device according to claim 7, wherein the physical layer control unit of an $n^{th}$ stage receives the clock output from the physical layer control unit of the $(n-1)^{th}$ stage and outputs the received clock to the logical layer control unit.

9. The electronic device according to claim 1, wherein physical layer control units of second to $(n-1)^{th}$ stages receive the clock output from physical layer control units of previous stages and output the received clock to physical layer control units of next stages.

10. The electronic device according to claim 1, wherein a physical layer control unit of an $n^{th}$ stage receives the clock output from a physical layer control unit of $(n-1)^{th}$ stage and outputs the received clock to the logical layer control unit.

11. An electronic device comprising:
    n (n is an integer greater than or equal to 2) physical layer control units which communicate with an other apparatus connected to the device itself and control a physical layer, wherein one of the n physical layer control units is connected to a resonator to generate a clock;
    a logical layer control unit which controls a logical layer in communication with the other apparatus;
    a control unit which controls the physical layer control unit to which the resonator is not connected and the logical layer control unit from a power-supply ON state to a standby state in accordance with a standby instruction for the device itself; and
    a first switch which receives the clock from the physical layer control unit to which the resonator is connected and switches from supplying the clock to the physical layer control units to which the resonator is not connected and the logical layer control unit to not supplying the clock in accordance with the standby instruction for the device itself.

12. The electronic device according to claim 11, wherein the control unit switches the first switch so that the clock input to the first switch is not supplied to a physical layer control unit in non-communication with the other apparatus among the plurality of physical layer control units.

13. The electronic device according to claim 11, wherein the control unit switches the first switch at a timing before a timing at which a second switch which switches control signals between the n physical layer control units and the logical layer control unit is switched in accordance with the standby instruction for the device itself.

14. The electronic device according to claim 11, further comprising a second switch which switches control signals between the n physical layer control units and the logical layer control unit,
    wherein the control unit switches the second switch so that the control signal output from the logical layer control unit is not supplied to the physical layer control unit to be controlled from the power-supply ON state to the standby state in accordance with the standby instruction for the device itself.

15. The electronic device according to claim 14, wherein the control unit switches the second switch so that the control signal input to the second switch is not supplied to a physical layer control unit in non-communication with the other apparatus among the plurality of physical layer control units.

16. The electronic device according to claim 11, further comprising a second switch which switches control signals between the n physical layer control units and the logical layer control unit,
    wherein the control unit switches the second switch so that the control signal input to the second switch is not supplied to a physical layer control unit in non-communication with the other apparatus among the plurality of physical layer control units.

17. The electronic device according to claim 11, wherein the n physical layer control units are connected in series in a daisy chain connection through a signal line of a clock.

18. The electronic device according to claim 17, wherein a physical layer control unit of a last stage connected in the daisy chain connection and the logical layer control unit are connected through the signal line of the clock.

19. The electronic device according to claim 18, wherein the clock generated by the physical layer control unit of a first stage to which a resonator is connected is output to a physical layer control unit of a second stage.

20. A method for controlling an electronic device, the electronic device comprising n (n is an integer greater than or equal to 2) physical layer control units which communicate with an other apparatus connected to the device itself and control a physical layer and a logical layer control unit which controls a logical layer in communication with the other apparatus, the method comprising:

generating a clock using a resonator connected to one physical layer control unit among the n physical layer control units;

controlling the physical layer control unit to which the resonator is not connected and the logical layer control unit from a power-supply ON state to a standby state in accordance with a standby instruction for the device itself; and switching from supplying the clock from the physical layer control unit to which the resonator is connected to the physical layer control units to which the resonator is not connected and the logical layer control unit to not supplying the clock in accordance with the standby instruction for the device itself.

* * * * *